Nov. 28, 1933.          S. R. BOYCE ET AL          1,937,329
            JOINT FOR RESISTING HIGH PRESSURES
                    Filed Dec. 15, 1931

Sydney R. Boyce
and Frank S. Lundy
INVENTORS

ATTORNEY.

Patented Nov. 28, 1933

1,937,329

UNITED STATES PATENT OFFICE 1,937,329

JOINT FOR RESISTING HIGH PRESSURES

Sydney Robert Boyce and Frank Sinclair Lundy, Norton-on-Tees, England, assignors to Imperial Chemical Industries Limited, a corporation of Great Britain Application December 15, 1931, Serial No. 581,248, and in Great Britain December 18, 1930

4 Claims. (Cl. 285—137)

This invention relates to high-pressure joints and in particular to cover joints for high-pressure vessels such as are employed in the synthetic ammonia industry and in other industrial high-pressure operations. The invention also applies to high-pressure pipe joints and to joints between cylindrical high-pressure vessels of considerable diameter, e. g. 3-5 feet.

According to the present invention, in a high-pressure joint, the sealing engagement is effected at opposite outer surfaces of a hard metal cup ring the internal surfaces of which are exposed to a high-pressure, the said outer surfaces being convex to the corresponding seating surfaces of the parts to be joined. By the term "cup ring" is meant any ring having a cupshaped cross-section, e. g. a ring of V or U-shaped cross-section. The sealing force is applied, in such a joint, parallel with the axis of the ring, or in such a direction as to have a substantial component in that direction, and the outer convex surfaces of the cup ring are brought into elastic line or band contact with the seating surfaces of the parts to be joined. Preferably, in order to safeguard against distortion of the cup ring beyond the elastic limit, an auxiliary ring is provided which bridges the cup walls and prevents their collapse under the compression to which they are subjected. In such case a small vent should be provided in the auxiliary ring to permit the high pressure to act upon the interior of the cup ring.

Figure 1:
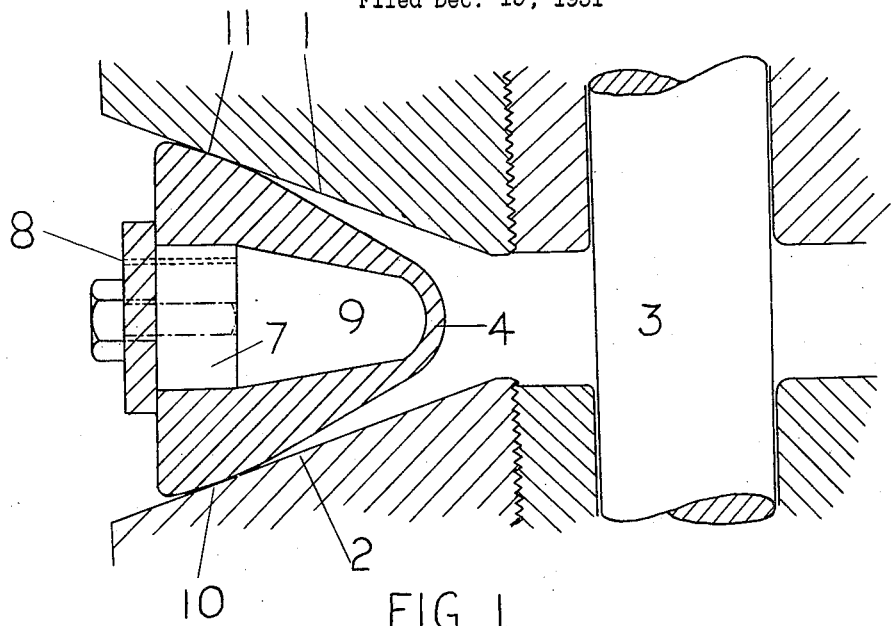
Figure 2:
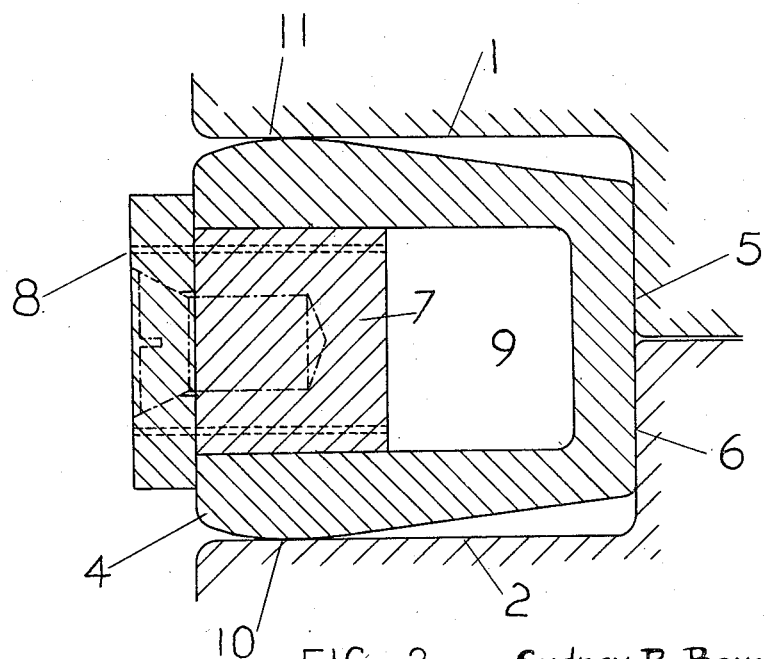

Two forms of the invention are illustrated in the accompanying drawing, to which, however, the invention is not limited. In this drawing Figures 1 and 2 are sections through assembled joints. Referring to Figure 1, the parts to be joined are provided with plane oblique seating surfaces 1 and 2, with means, e. g. bolts 3, for drawing the two parts together. The steel cup ring 4 is of V-shaped section and an auxiliary steel ring 7 bridges its walls, which ring 7 may be divided for convenience in assembling. A vent 8 affords communication for the high-pressure fluid between the interior of the vessel and the space 9 bounded by the rings 4 and 7.

Sealing engagement is made between the outer convex surfaces of the ring 4 and the faces 1 and 2, the contact being a circular line or narrow band (10 and 11).

Referring to Figure 2, the cup ring 4 is of U-shaped section with flat base which abuts against corresponding plane surfaces 5 and 6 on the parts to be joined, thus preventing radial movement of the ring. Sealing engagement is made at 10 and 11 between the convex sides of the ring 4 and the corresponding faces 1 and 2 of the parts to be joined. As before, an auxiliary ring 7, vented at 8, bridges the walls of the ring 4. Assuming that sealing engagement has been secured by external mechanical means, further increase of pressure within the vessel will result in the walls of the ring 4 being forced outwardly against the faces 1 and 2, thus tightening the joint, the ring of course being made sufficiently flexible for this purpose.

The improved joint made according to the invention presents the advantage that increased elasticity is obtained in the ring whereby greater fluctuations of pressure can be accommodated without the joint failing. Also little external initial force is required in making the joint, since once the parts are in engagement the internal pressure assists by pressing the ring outwardly.

The flexibility of the ring is also enhanced by tapering it outwardly so that the bottom of the cup is relatively thin compared with the side walls at which the joint is made. Finally, by locating the line of contact near the edge of the ring, as shown at 10 and 11, the sealing force due to the internal pressure is magnified since the internal pressure acts over practically the whole interior surface of the ring and is not balanced by corresponding pressure on the outer surface of the ring except over the relatively small area between the edge of the ring and the line of contact.

A joint for resisting high pressure has already been proposed in which a cup ring of flexible steel or other hard metal is located in corresponding annular recesses formed in the parts to be joined, the internal surfaces of the cup ring being exposed to the high pressure and the edges or sides of the cup ring being compressed against the elastic resistance of the metal when the parts to be joined are bolted or secured together; in the said joint, however, the sides of the cup ring were not convex to the seating surfaces and the sealing contact would be made over practically the whole area of the sides of the ring. This construction, moreover, necessitates perfect fitting between the sides of the cup ring and the seating surfaces, which therefore must be very carefully machined. In the joint of the present invention, however, the sealing contact is made over a narrow band and the effective sealing force is thereby magnified and the joint enabled to accommodate greater variations of internal pressure without failing, while at the same time the seating surfaces and the surfaces of the cup ring do not need to be machined to such accurate limits as in the said previously proposed joint.

As many apparently widely different embodiments of this invention may be made without departing from the spirit and scope thereof, it is to be understood that we do not limit ourselves to the specific embodiments thereof except as defined in the appended claims.

We claim:—

1. A joint for resisting high pressure comprising, in combination, two seating surfaces formed respectively on the parts to be joined, a hard metal cup ring seated between said surfaces and in contact therewith, said cup ring having convex outer seating surfaces and being arranged with the mouth of the cup towards the high pressure, tightening means for bringing together the parts to be joined into sealing contact with the cup ring, and an auxiliary ring bridging the walls of the cup ring and adapted to take the thrust of said tightening means and to enable elastic sealing contact to be established at the convex seating surfaces of the cup ring without substantial collapse of said cup ring, said auxiliary ring being perforated to allow of the high pressure acting in the interior of the cup ring.

2. A joint as set forth in claim 1, in which the walls of the cup ring taper towards the bight, so that the bottom of the cup is relatively thin compared with the walls.

3. A joint as set forth in claim 1, in which the convex seating surfaces of the cup ring are located near the inner edge of the ring.

4. A joint as set forth in claim 1, in which the base of the cup ring abuts against the parts to be joined, thereby preventing radial movement of the ring.

SYDNEY ROBERT BOYCE.
FRANK S. LUNDY.